United States Patent
Lemmens et al.

(10) Patent No.: US 11,649,128 B2
(45) Date of Patent: May 16, 2023

(54) APPARATUS AND METHOD FOR MAKING A COIL OF DUNNAGE

(71) Applicant: Ranpak Corp., Concord Township, OH (US)

(72) Inventors: Peter L. C. Lemmens, Gronsveld (NL); Jordy van der Kaap, Spaubeek (NL)

(73) Assignee: Ranpak Corp., Concord Township, OH (US)

( * ) Notice: Subject to any disclaimer, the term of this patent is extended or adjusted under 35 U.S.C. 154(b) by 373 days.

(21) Appl. No.: 16/314,189

(22) PCT Filed: Jun. 29, 2017

(86) PCT No.: PCT/US2017/039945
§ 371 (c)(1),
(2) Date: Dec. 28, 2018

(87) PCT Pub. No.: WO2018/005764
PCT Pub. Date: Jan. 4, 2018

(65) Prior Publication Data
US 2019/0225445 A1      Jul. 25, 2019

Related U.S. Application Data

(60) Provisional application No. 62/355,964, filed on Jun. 29, 2016.

(51) Int. Cl.
*B31D 5/00*      (2017.01)
*B65H 23/195*      (2006.01)
*B65H 23/198*      (2006.01)

(52) U.S. Cl.
CPC ....... *B65H 23/1955* (2013.01); *B31D 5/0065* (2013.01); *B65H 23/198* (2013.01);
(Continued)

(58) Field of Classification Search
CPC .............. B65H 23/1955; B65H 23/198; B65H 2220/01; B65H 2301/4148;
(Continued)

(56) References Cited

U.S. PATENT DOCUMENTS

| 3,365,143 A | 1/1968 | Gottfried |
| 3,441,825 A | 4/1969 | Dinger |

(Continued)

FOREIGN PATENT DOCUMENTS

| DE | 19911628 A1 | 9/2000 |
| DE | 102011006404 A1 | 10/2012 |

(Continued)

OTHER PUBLICATIONS

The International Search Report and The Written Opinion of The International Searching Authority for Corresponding International Application PCT/US17/39945 dated Oct. 12, 2017.

(Continued)

*Primary Examiner* — Sameh Tawfik
(74) *Attorney, Agent, or Firm* — Renner, Otto, Boisselle & Sklar, LLP

(57) ABSTRACT

A dunnage conversion system for making a coil of dunnage from a sheet stock includes a coiler, a movable dancer upstream of the coiler and interposed in a path of the sheet stock, and a controller communicatively coupled to each of the coiler and the movable dancer. The coiler is configured to wind the sheet stock, and the controller is configured to control the speed of the coiler based on the position of the movable dancer to control tension of the sheet stock upstream of the coiler. The sheet stock drawn about the movable dancer may be a slit-sheet stock having a plurality of slits configured to expand under tension applied in a feed direction. The controller may be configured to control expansion of the slit-sheet stock upstream of the coiler (Continued)

allowing conversion of the sheet stock into a coil of relatively less dense dunnage prior to or during winding.

8 Claims, 7 Drawing Sheets

(52) U.S. Cl.
CPC ............... *B31D 2205/0023* (2013.01); *B31D 2205/0058* (2013.01); *B65H 2220/01* (2013.01); *B65H 2301/4148* (2013.01); *B65H 2511/112* (2013.01); *B65H 2513/11* (2013.01); *B65H 2801/63* (2013.01)

(58) Field of Classification Search
CPC .......... B65H 2511/112; B65H 2513/11; B65H 2801/63; B31D 5/0065; B31D 2205/0023; B31D 2205/0058; B31D 2205/0005; B31D 2205/0029; B31D 5/0039
USPC ......................................................... 493/339
See application file for complete search history.

(56) References Cited

U.S. PATENT DOCUMENTS

| | | | | |
|---|---|---|---|---|
| 4,159,808 A | * | 7/1979 | Meihofer | B65H 23/1955 242/413.1 |
| 4,775,086 A | * | 10/1988 | Kataoka | B65H 23/1888 226/44 |
| 5,538,778 A | | 7/1996 | Hurwitz et al. | |
| 5,667,871 A | | 9/1997 | Goodrich et al. | |
| 5,688,578 A | | 11/1997 | Goodrich | |
| 5,782,735 A | | 7/1998 | Goodrich et al. | |
| 6,402,674 B1 | | 6/2002 | Simmons et al. | |
| 8,827,197 B2 | * | 9/2014 | Powers | B32B 27/08 242/530.2 |
| 9,376,280 B2 | * | 6/2016 | Page | B65H 23/06 |
| 9,701,091 B2 | * | 7/2017 | Page | B65H 16/005 |
| 2003/0015981 A1 | * | 1/2003 | Debuf | B65H 18/10 318/430 |
| 2006/0096708 A1 | | 5/2006 | Robinson | |
| 2007/0079713 A1 | * | 4/2007 | Koeda | B65H 18/10 101/228 |
| 2009/0321439 A1 | * | 12/2009 | Cepak | B60K 15/077 220/62.17 |
| 2011/0000948 A1 | * | 1/2011 | Fuwa | B65H 23/032 226/3 |
| 2015/0140265 A1 | * | 5/2015 | Page | B65D 81/03 428/136 |
| 2016/0001519 A1 | | 1/2016 | Winkens et al. | |
| 2016/0101562 A1 | * | 4/2016 | Pellengo Gatti | B65H 23/195 264/165 |
| 2016/0130104 A1 | | 5/2016 | Page et al. | |
| 2017/0275119 A1 | * | 9/2017 | Hamano | B65H 23/188 |
| 2020/0230908 A1 | * | 7/2020 | Goodrich | B31D 5/0065 |

FOREIGN PATENT DOCUMENTS

| | | |
|---|---|---|
| EP | 0978372 A2 | 9/2000 |
| JP | 2009046237 A | 3/2009 |
| WO | 9507225 A2 | 3/1995 |
| WO | 2015103251 A1 | 7/2015 |
| WO | 2016077728 A1 | 5/2016 |
| WO | 2016137740 A1 | 9/2016 |
| WO | 2017039792 A1 | 3/2017 |
| WO | 2017074535 A1 | 5/2017 |

OTHER PUBLICATIONS

Communication pursuant to Article 94(3) EPC dated Sep. 27, 2022, for corresponding European Patent Application No. 17737990.6.

\* cited by examiner

APPARATUS AND METHOD FOR MAKING A COIL OF DUNNAGE

RELATED APPLICATIONS

This application is a national phase of International Application No. PCT/US2017/039945, filed Jun. 29, 2017, and published in the English language, and which claims priority to U.S. application Ser. No. 62/355,964 filed Jun. 29, 2016, both which are each hereby incorporated herein by reference in their entireties.

FIELD OF THE INVENTION

This invention relates generally to dunnage conversion systems for making a coil of dunnage and more particularly to dunnage conversion systems machines that convert a sheet stock into a coil of relatively less dense dunnage.

BACKGROUND

In the process of shipping one or more articles from one location to another, a packer typically places some type of dunnage in a shipping container, such as a cardboard box, along with the article or articles to be shipped. The dunnage typically is used to wrap the articles, or to partially or completely fill the empty space or void volume around the articles in the container. By filling the void volume, the dunnage restricts or prevents movement of the articles that might lead to damage during the shipment process. The dunnage also can perform blocking, bracing, or cushioning functions.

Some commonly used dunnage products are plastic foam peanuts, plastic bubble pack, air bags, and converted paper dunnage material. Many of these dunnage products are produced in substantially continuous lengths for storing or transporting these dunnage products. Until ready for use, they may be wound into a coiled configuration. When ready for use, discrete lengths of dunnage are separated from the coil.

SUMMARY

The present invention provides an improved dunnage conversion system for making a coil of dunnage from a sheet stock. An unconverted form of the sheet stock may be converted into a relatively less dense converted sheet stock, also referred to as dunnage or a strip of dunnage, and wound into a coil. By controlling the speed of the coiling based on detected tension in the sheet stock (unconverted, partially converted, or fully converted) upstream of the coiler, the system can provide a more consistent coil of dunnage, thereby restricting or preventing crushing of layers of converted stock wound in the coil, tearing in the sheet stock, or forming a loose coil that is more difficult to store, transport, and then unwind when ready for use.

As used herein, the generalized term sheet stock may refer to unconverted sheet stock, partially converted sheet stock, fully converted sheet stock, or a combination thereof. For example, an unconverted sheet stock may be converted to a converted sheet stock prior to or as it is wound, and a converted form of the sheet stock is wound into a coiled configuration.

One embodiment of a dunnage conversion system in accordance with the invention includes a coiler, a movable dancer upstream of the coiler and interposed in a path of the sheet stock between a supply of sheet stock and the coiler, and a controller communicatively coupled to each of the coiler and the movable dancer. The coiler is configured to wind converted sheet stock into a coiled configuration to form a coil of dunnage. The controller is configured to control the speed of the coiler based on the position of the movable dancer to control tension of the sheet stock upstream of the coiler.

The sheet stock drawn about the movable dancer to the coiler may be a slit-sheet stock, for example, having a plurality of slits configured to expand under tension applied across the slits, such as in a feed direction. The controller may be configured to control expansion of the slit-sheet stock upstream of the coiler allowing conversion of the sheet stock into a relatively less dense dunnage prior to or as it is wound into a coil.

More particularly, according to a first aspect of the invention, there is a dunnage conversion system for making a coil of dunnage from a sheet stock. The dunnage conversion system includes a coiler that is configured to wind the sheet stock in a converted form into a coiled configuration to form a coil of dunnage. The dunnage conversion system also includes a movable dancer interposed in a path of the sheet stock, upstream of the coiler, about which the sheet stock is drawn, and a controller communicatively coupled to the coiler and to the movable dancer, where the controller is configured to control the speed of the coiler based on the position of the movable dancer to control tension of the sheet stock upstream of the coiler and thereby to control the expansion of a slit-sheet stock, for example.

According to a second aspect of the invention, there is another dunnage conversion system for making a coil of dunnage from a sheet stock. The dunnage conversion system includes a coiler that is configured to wind the sheet stock in a converted form into a coiled configuration to form a coil of dunnage. The dunnage conversion system also includes a movable dancer interposed in a path of the sheet stock, upstream of the coiler, about which the sheet stock is drawn, the movable dancer being pivotable between an upper limit detection area and a lower limit detection area. A controller is communicatively coupled to the coiler and to the movable dancer. The controller is configured to vary the speed of the coiler upon pivoting of the movable dancer out of a default detection area angularly disposed between the upper limit detection area and the lower limit detection area.

Embodiments of the invention may have one or more of the following features:

The controller may be configured to control a winding speed of a slit-sheet stock to control conversion of the slit-sheet stock via expansion of the slit-sheet stock upstream of the coiler.

The movable dancer may pivot in response to tension of the sheet stock drawn between a supply of the sheet stock and the coiler.

The movable dancer may pivot in response to contact with the sheet stock upstream of the coiler, where the controller may increase the speed of the coiler in response to a pivoting movement of the movable dancer in a first direction, and the controller may decrease the speed of the coiler in response to pivoting movement of the movable dancer in a second direction opposite the first direction.

The coiler may include a powered rotating spindle that is configured to rotate at a variable speed in response to varying tension of the sheet stock at the location of the movable dancer.

The speed at which the controller is configured to run the coiler may be inversely proportional to a tension in the sheet stock drawn about the movable dancer.

The dunnage conversion system may further include a rotary encoder for measuring the position of the movable dancer relative to a default position, the rotary encoder being configured for communication with the controller.

The rotary encoder may be configured to measure the angular position of the movable dancer relative to the default position.

The dunnage conversion system may be in combination with a supply assembly having a supply of sheet stock received at the dunnage conversion system, where the sheet stock is a slit-sheet stock having a plurality of slits configured to expand under tension applied in a feed direction transverse the slits.

The supply assembly may further include a supply of separator sheet material, where the coiler is configured to concurrently receive and wind the separator sheet material and the converted slit-sheet stock in alternating wound layers.

The controller may be configured to run the coiler at a first speed when the movable dancer is disposed in the default detection area and at a second speed greater than the first speed when the movable dancer is disposed in the lower limit detection area, and the controller may be further configured to run the coiler at a third speed being lesser than each of the first speed and the second speed when the movable dancer is disposed in the upper limit detection area.

The controller may be configured to progressively change the speed of the coiler in response to movement of the movable dancer out of the default detection area.

According to a third aspect of the invention, a dunnage conversion system for making a coil of dunnage from a sheet stock includes a coiling means for winding sheet stock in a converted form into a coiled configuration to form a coil of dunnage. The dunnage conversion system also includes a movable dancing means upstream of the coiling means about which the sheet stock is drawn, the movable dancing means for applying tension in the sheet stock between the movable dancing means and the coiling means. The dunnage conversion system further includes a controlling means communicatively coupled to the coiling means and to the movable dancing means, the controlling means for controlling the speed of the coiling means in relation to a relative positioning of the movable dancing means to control the tension in the sheet stock between the movable dancing means and the coiling means.

The dunnage conversion system may further include a measuring means for measuring a pivot angle of the movable dancing means as the sheet stock is drawn about the measuring means.

The controlling means may be configured to control a winding speed of a slit-sheet stock to control, upstream of the coiling means, the conversion via expansion of the slit-sheet stock into an expanded strip of dunnage.

According to a fourth aspect of the invention, a method of making a coil of dunnage from a sheet stock includes the steps of (a) winding the sheet stock in a converted form into a coiled configuration about a spindle to form the coil of dunnage, (b) drawing the sheet stock upstream of the spindle about a movable dancer, the drawing applying tension in the sheet stock extending between the movable dancer and the spindle, and (c) controlling the rotational speed of the spindle to control the tension in the sheet stock upstream of the spindle, the speed being controlled in an inverse relationship relative to a tension in the sheet stock drawn about the movable dancer.

The step of controlling the rotational speed of the spindle may include controlling the speed based on an angular position of the movable dancer.

The sheet stock may be a slit-sheet stock, and the method may further include the step of conversion of the slit-sheet stock via expanding of the slit-sheet stock, upstream of the spindle, into an expanded strip of dunnage.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

Figure 1:
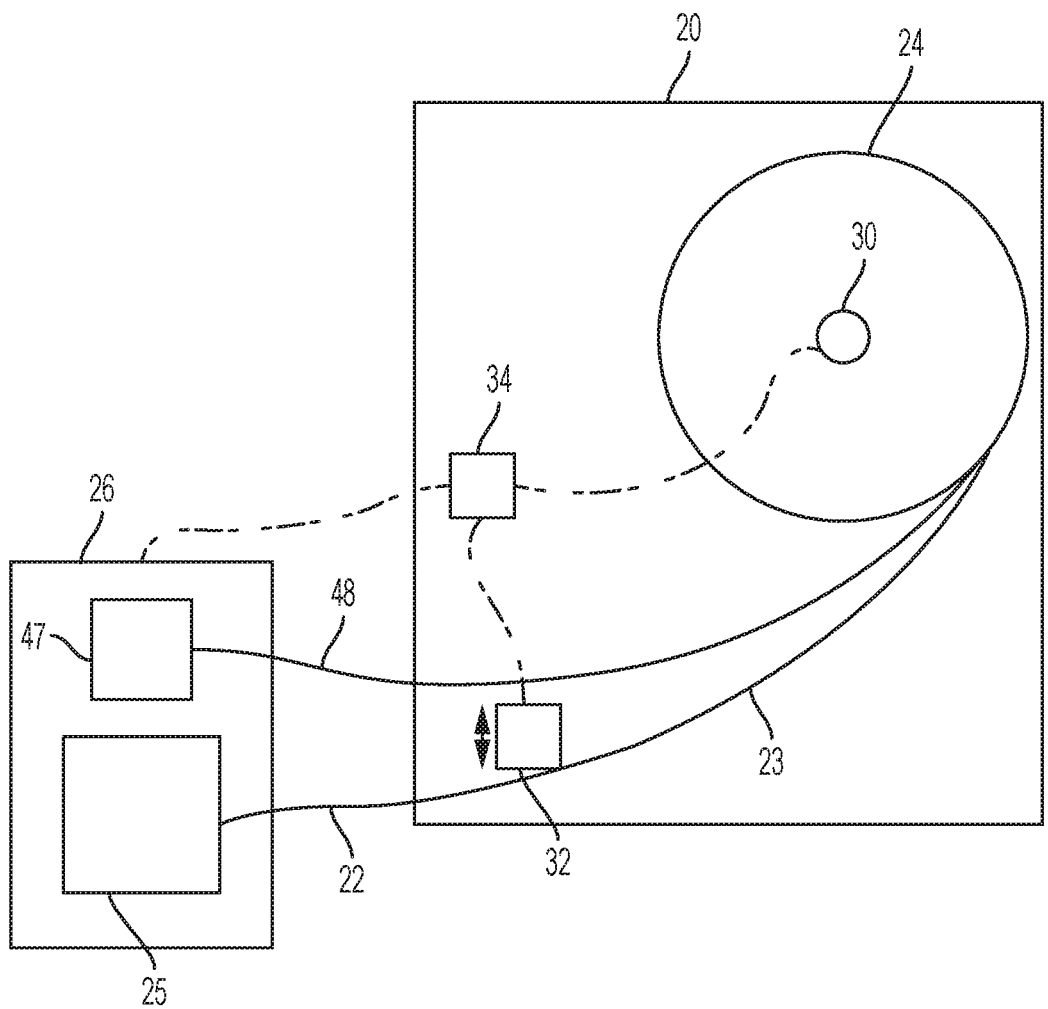
FIG. 1 is a schematic illustration of an exemplary dunnage conversion system in accordance with the invention, for making a coil of dunnage. The dunnage conversion system is shown in combination with a stock supply assembly.

The present invention generally provides a dunnage conversion system and method for making a coil of dunnage from a sheet stock. With reference initially to FIG. 1, an exemplary dunnage conversion system 20 is configured to convert an unconverted sheet stock 22 of at least one ply, and being generally planar and two-dimensional, into a converted sheet stock 23, also referred to as a strip of dunnage 23. The dunnage product 24 has a three-dimensional shape and increased volume per unit of length, as compared to the original unconverted sheet stock 22, The exemplary dunnage conversion system 20 is configured to then wind the converted sheet stock 23 into a coil of dunnage 24.

The dunnage conversion system 20 includes a coiling means 30 for winding the converted sheet stock 23, also herein referred to as a sheet stock 23 in a converted form, into the coil of dunnage 24. A movable dancing means 32 is provided for applying tension in the sheet stock 22, 23 upstream of the coiling means 30, for example, as it is drawn from a respective supply 25. A controlling means 34 is communicatively coupled to each of the coiling means 30 and the movable dancing means 32 for controlling the winding speed of the coiling means 30 in relation to a position of the movable dancing means 32, to control tension of the sheet stock 22, 23 extending between the movable dancing means 32 and the coiling means 30.

The dunnage conversion system 20 may be provided in combination with a stock supply assembly 26 including a bulk supply 25 of unconverted sheet stock 22 for conversion into the converted sheet stock 23 while being coiled to form the coil of dunnage 24. In some embodiments, the controlling means 34 may control, such as separately control, an unwinding/unstacking speed of the unconverted sheet stock 22 from the stock supply assembly 26. In other embodiments, the winding of the coiling means 30 may be sufficient to draw the unconverted sheet stock 22 from the stock supply assembly 26.

In the depicted embodiment, the bulk supply 25 of the unconverted sheet stock 22 may be arranged on a stand or a cart of the stock supply assembly 26. The stand or cart may be attached to or simply supported adjacent the dunnage conversion system 20. The unconverted sheet stock 22 of the bulk supply 25 may be of a substantially continuous length, and may be provided either in roll form or as a series of connected, generally rectangular pages in a fan-folded stack. The rolls or stacks can be spliced to respective ones of successive supplies so as to appear as a never-ending supply to the dunnage conversion system 20.

Multiple rolls or stacks may be used to provide multiple sheets or webs of stock material for conversion into a three-dimensional dunnage product. Alternatively, a single roll may include multiple plies co-wrapped into the single roll or a single stack may include multiple plies co-folded into the single stack.

Suitable supplies of sheet stock include paper, plastic sheets, or sheets of a combination thereof. The sheet stock also may be laminated or may include a combination of laminated and non-laminated sheet material. An exemplary sheet stock for use with the dunnage conversion system 20 includes either a single-ply or multi-ply kraft paper. Suitable kraft paper may have various basis weights, such as twenty-pound or forty-pound, for example, and respective plies may have different basis weights. One exemplary sheet stock may be a single-ply kraft paper that is ecologically-friendly, recyclable, biodegradable, and composed of a renewable resource.

The unconverted sheet stock 22 preferably is an unconverted slit-sheet stock 22 having a plurality of longitudinally-spaced, transversely-extending rows of slits 42 cut into the sheet. More particularly, the exemplary unconverted slit-sheet stock 22 with its plurality of slits 42 is configured to expand in a feed direction transverse the slits 42 and parallel to a longitudinal dimension of the unconverted sheet stock 22 as it travels in a downstream direction, such as through the dunnage conversion system 20. For example, under tension across the a slit 42, the unconverted sheet stock 22 adjacent an upstream side of the slit 42 separates from the unconverted sheet stock 22 adjacent a downstream side of the slit 42. The slits 42 may be formed by cutting the unconverted sheet stock 22, or by otherwise weakening the unconverted sheet stock 22 intermittently across the unconverted sheet stock 22 so that the unconverted sheet stock 22 separates across the slits 42 under longitudinal tension provided in the direction of advancement transverse the slits 42.

As used herein, the downstream direction is the direction of advancement of the unconverted sheet stock 22 and the converted sheet stock 23, such as through the dunnage conversion system 20. The downstream direction also may be referred to as the feed direction. An upstream direction is the direction opposite the downstream direction of advancement.

In the illustrated embodiment, the slits 42 are cut through the unconverted sheet stock 22 and extend in a lateral direction across the width of the unconverted sheet stock 22 between the lateral edges 44. The lateral direction is transverse the longitudinal feed direction of the unconverted sheet stock 22.

Typically, the slits 42 are provided in rows, such as longitudinally-spaced lateral rows, that are generally parallel to one another and are generally periodically, and typically, equally, longitudinally-spaced from one another. The slits 42 are intermittently dispersed across the rows, with the slits 42 of each row generally being staggered in relation to slits 42 of directly adjacent rows. Across each row of slits 42, there may be a greater length of combined slits 42 than a length of un-slit portions 46 disposed between slit endpoints, providing for an optimum amount of expansion of the unconverted sheet stock 22.

The exemplary unconverted slit-sheet stock 22 is configured for expanding in one or more dimensions, also herein referred to as volume expansion or volumetric expansion. When the unconverted slit-sheet stock 22 is stretched in a direction transverse the direction of the slits 42, typically in the longitudinal feed direction, perpendicular to a width dimension, the longitudinal length and thickness increase, while the lateral width dimension decreases. The thickness of the unconverted slit-sheet stock 22 can increase by an order of magnitude, or more, relative to its original thickness, when stretched in this manner. The expanded (converted) slit-sheet stock 23 has an increased length, an increased thickness, and a reduced width as compared to the unexpanded (unconverted) slit-sheet stock 22, and overall an increased volume. The increased volume allows resultant expanded slit-sheet stock 23, also referred to as dunnage 23 to serve as a perforate protective void-fill or cushioning wrap for packaging articles in containers.

Figure 2:
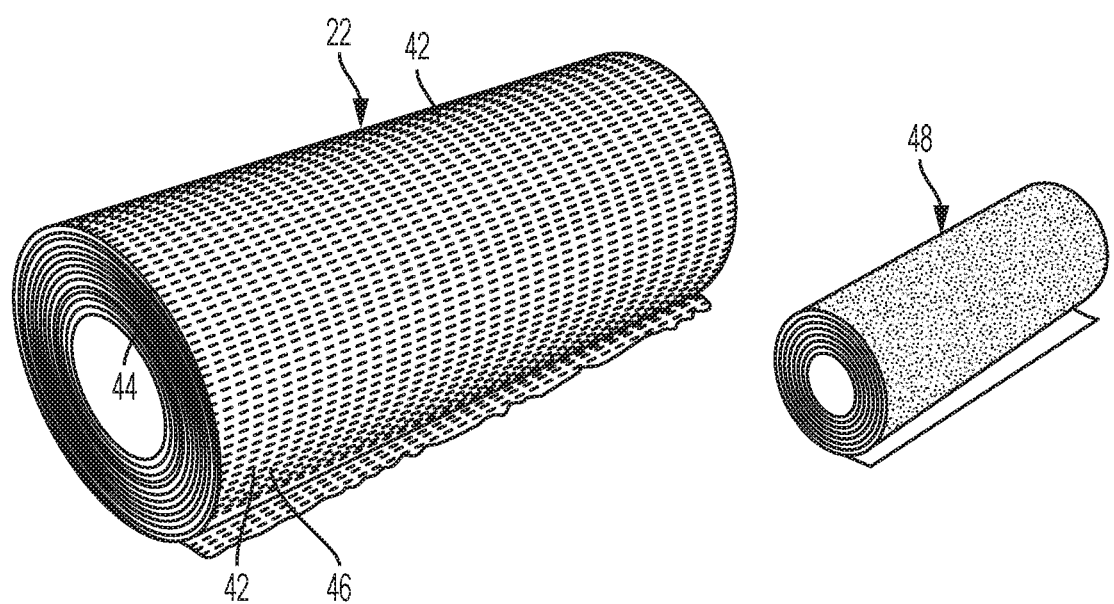
FIG. 2 is a perspective view of an exemplary slit-sheet stock and an exemplary separator sheet material shown separately from the stock supply assembly of FIG. 1.

Even though FIG. 2 depicts a particular arrangement of slits 42, the dunnage conversion system 20 provided by the invention may be used with a supply of unconverted sheet stock 22 with a different arrangement of slits 42. For example, in other embodiments the slits or rows may be otherwise suitably arranged relative to one another.

Referring again to FIG. 1, and also to FIG. 2, the stock supply assembly 26 also may include a bulk supply 47 of separator sheet material 48. An exemplary separator sheet material 48, also herein referred to as interleaf, may be a tissue paper, a thin kraft paper such as thinner than the unconverted slit-sheet stock 22, a plastic, a combination thereof, etc. Like the unconverted slit-sheet stock 22, the separator sheet material 48 may have a substantially continuous length, and may be provided either in roll form or as a series of connected, generally rectangular pages in a fan-folded stack. The rolls or stacks can be spliced to respective ones of successive supplies so as to appear as a never-ending supply to the dunnage conversion system 20.

The separator sheet material 48 may be coiled by the coiling means 30, but its path to the coiling means 30 may be spaced from the movable dancing means 32. Because the interleaf 48 does not expand, controlling tension in the sheet stock 22, 23 is sufficient. The coiling means 30 may be configured to concurrently receive and wind both the separator sheet material 48 and the converted slit-sheet stock 23 in alternating wound layers.

Turning now to FIGS. 3-7, another exemplary embodiment of a dunnage conversion system is explained in greater detail. The dunnage conversion system 120 is configured for making a coil of dunnage 124 from a slit-sheet stock, and is shown in combination with a stock supply assembly 126, which includes both a supply of an unconverted slit-sheet stock 122 and a supply of separator material 134.

Briefly, the stock supply assembly 126 includes a supply frame 136 that is coupled to a frame 150 of the dunnage conversion system 120, but may be supported adjacent the frame 150 in other embodiments. The unconverted slit-sheet stock 122 and separator material 134 are each wound about hollow cores 138 that are supported on rods 140 rotatably coupled to the supply frame 136. The dunnage conversion system 120 is configured for making a coil of alternating layers of expanded slit-sheet stock 123 and separator material 134. The separator material 134 may be omitted from the resultant coil of dunnage 124 if preferred.

Figure 3:
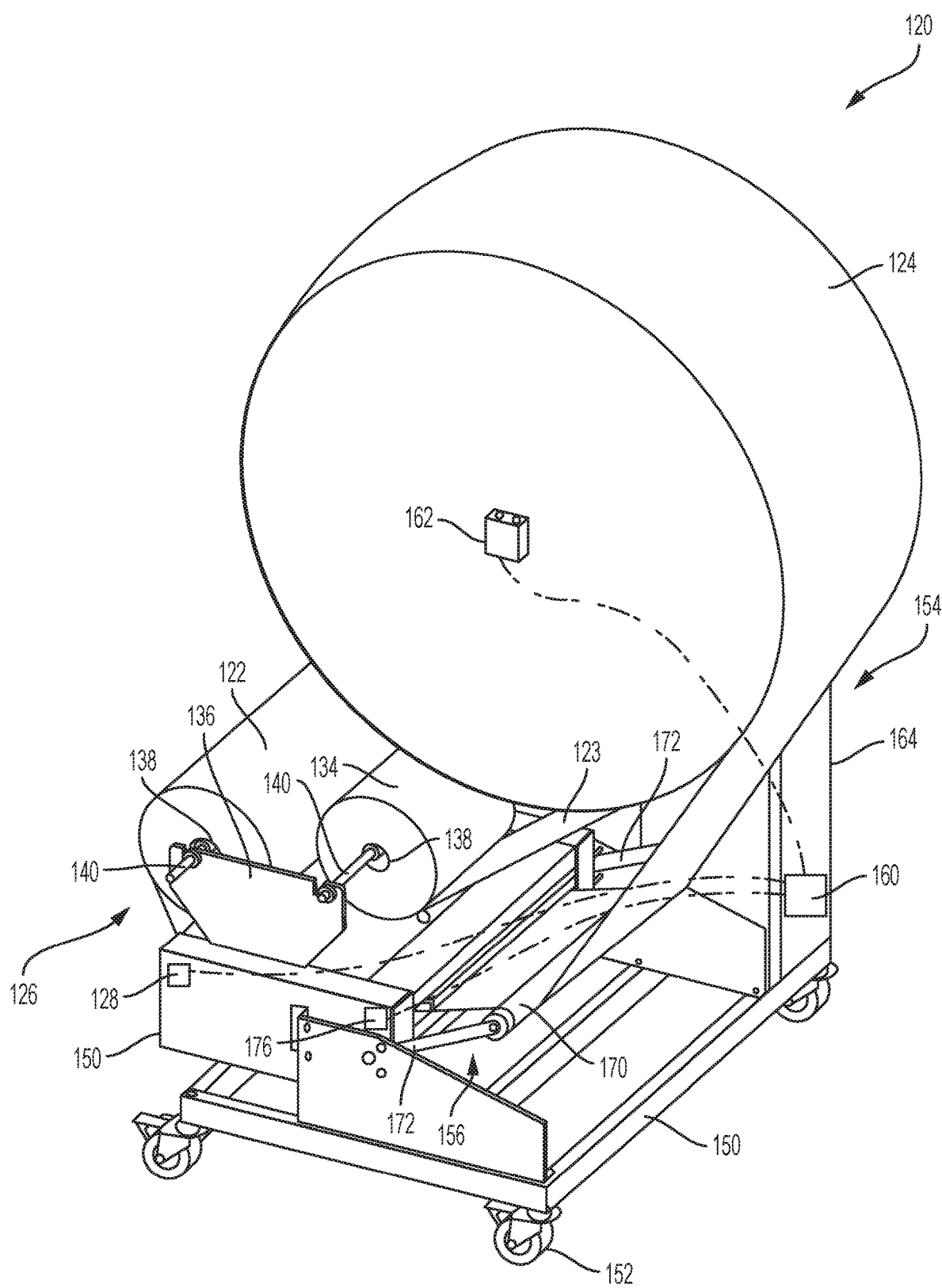
FIG. 3 is a perspective side view of another exemplary dunnage conversion system in accordance with the invention, for making a coil of dunnage. The dunnage conversion system is shown in combination with a stock supply assembly.
Figure 4:
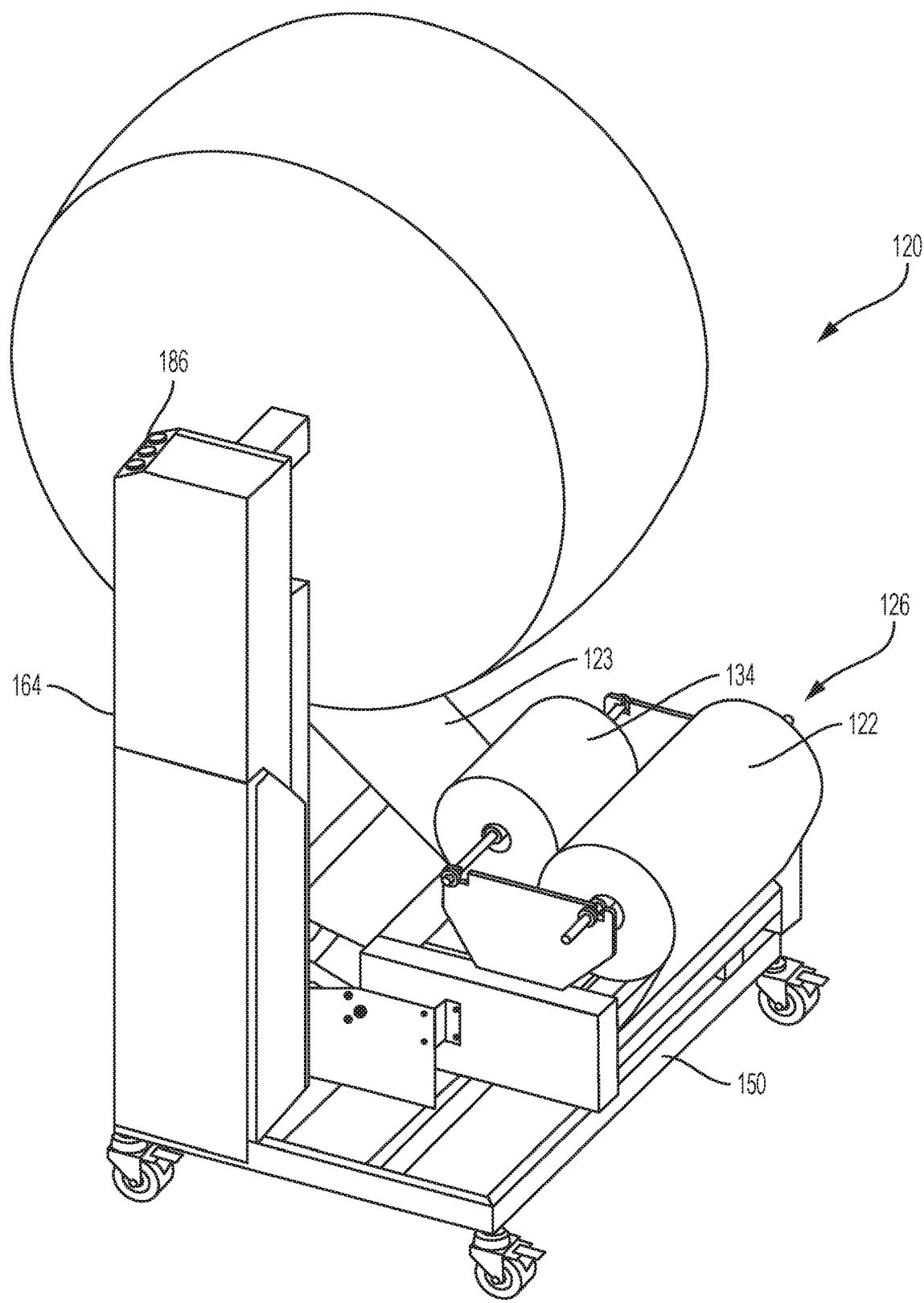
FIG. 4 is another perspective side view of the dunnage conversion system of FIG. 2.
Figure 5:
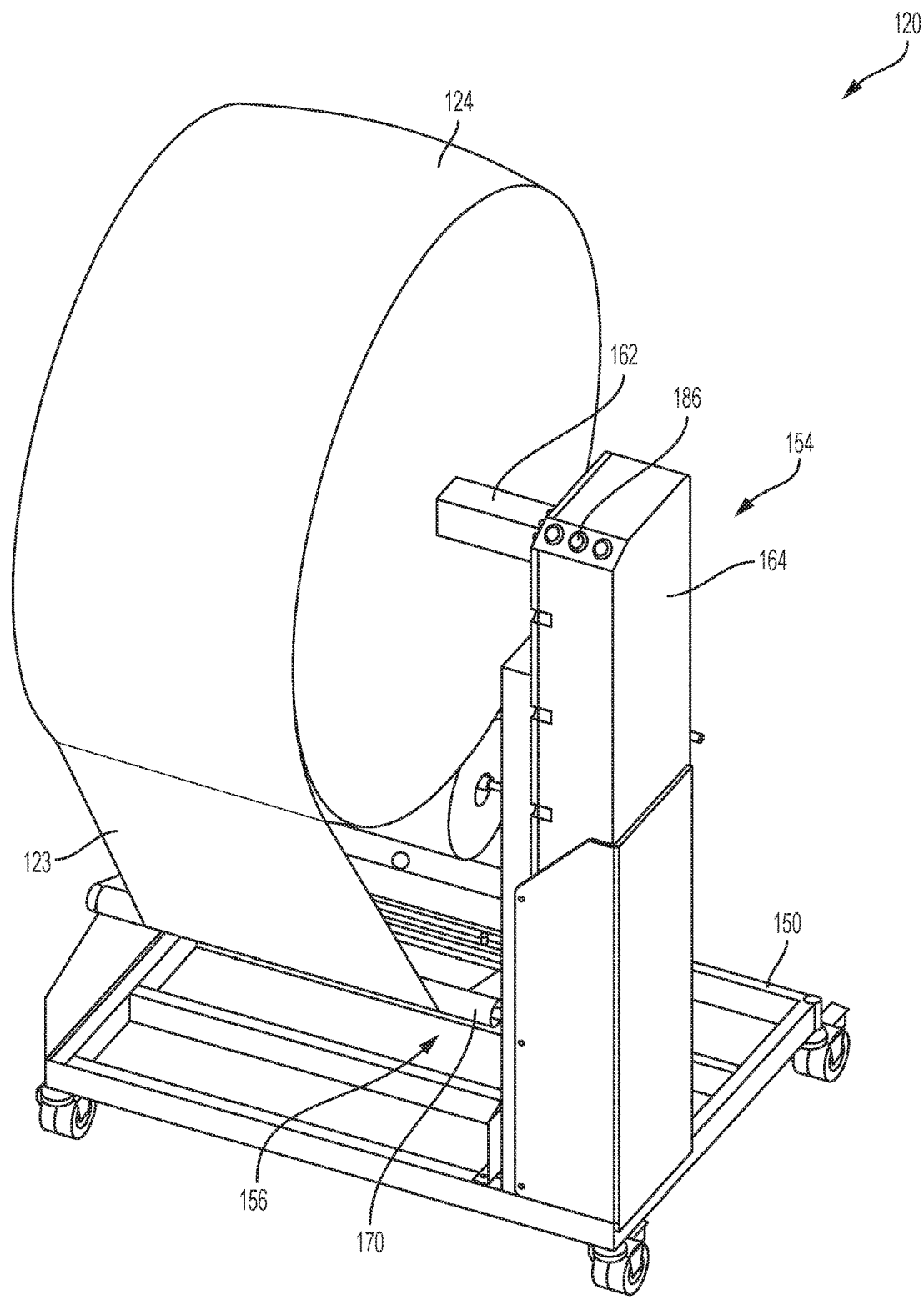
FIG. 5 is a perspective side view of the dunnage conversion system of FIG. 2.
Figure 6:
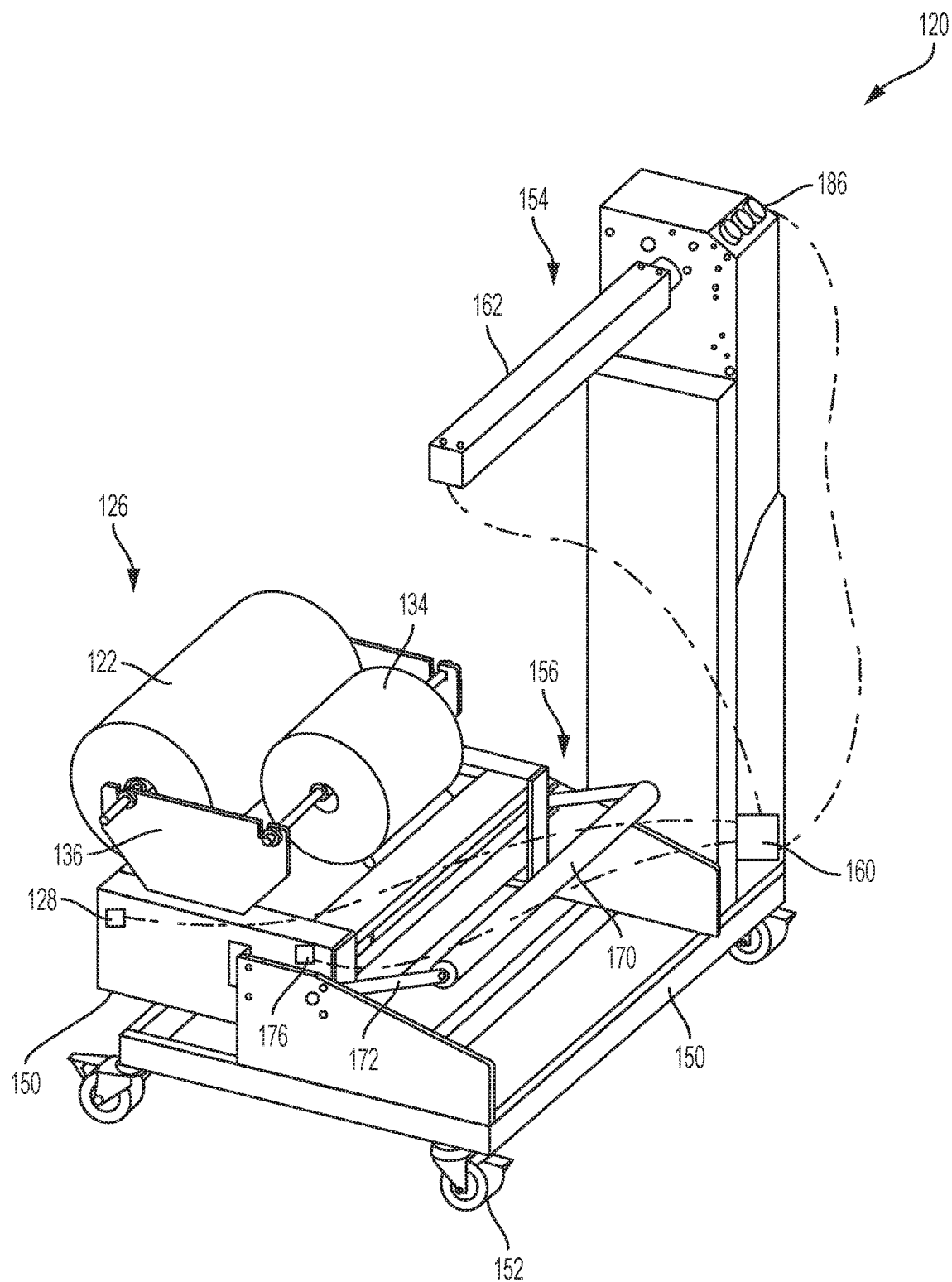
FIG. 6 is a perspective side view of the dunnage conversion system of FIG. 2, with the coil of dunnage removed to show additional aspects of the system.

Turning to details of the dunnage conversion system 120, the system 120 includes a coiler 154 that concurrently winds sheet stock, such as the converted slit-sheet stock 123 and separator material 134, into a coiled configuration. A movable dancer 156 is provided upstream of the coiler 154 and applies tension to the slit-sheet stock 122, 123, as it advances to the coiler 154. A controller 160 is communicatively coupled to the coiler 154 and to the movable dancer 156, and is configured to control the coiler 154 in relation to a position of the movable dancer 156 correlated to tension in the sheet stock 122, 123, to be discussed further in detail. The controller 160 may be communicatively coupled to a supply controller 128 of the stock supply assembly 126 for controlling the unwinding of the stock supply 122 and/or separator material 134, as shown in FIG. 3. Each of the coiler 154, the movable dancer 156, and the controller 160 are supported relative to the frame 150, which may have wheels or castors 152 attached thereto.

Referring first to the coiler 154, the coiler 154 is configured to wind the converted sheet stock 123. The coiler 154 includes a powered spindle 162 that is rotatably coupled to a drive unit 164, which is in turn coupled to the frame 150. The drive unit 164 includes a suitable motor for rotatably driving the powered spindle 162.

In some embodiments, the spindle 162 may include an engagement mechanism for securely holding a lead end of the converted sheet stock 123.

The coiler 154, and more particularly a spindle 162, is configured to rotate at a variable speed to enable optimum expansion of the unconverted slit-sheet stock 122 and to wind the converted sheet stock 123 into the coil 124, while limiting or preventing tearing of the slit-sheet stock 122, 123, such as between slits, or other problems. The variable speed of the coiler 154 may be controlled in response to a varying tension of the slit-sheet stock 122, 123 at a location of the movable dancer 156, where expansion generally occurs.

The movable dancer 156 not only applies tension in the sheet stock 122, 123 drawn about the movable dancer 156, but in doing so may limit or prevent lateral wandering of the converted sheet stock 123 along the spindle 162 as the converted sheet stock 123 is wound about the spindle 162. The movable dancer 156 is pivotably coupled to the frame 150 and pivots in response to a pulling tension in the slit-sheet stock 122, 123 extending between the movable dancer 156 and the coiler 154. The movable dancer 156 includes a guide member 170 around which the slit-sheet stock 122 is drawn between the stock supply assembly 126 and the coiler 154. Thus, the movable dancer 156, and particularly, the guide member 170 is interposed in a path of the sheet stock 122, 123 between the stock supply assembly 126 and the coiler 154.

The guide member 170 is coupled, such as rotatably coupled, to at least one tension arm 172 that is coupled, such as pivotably coupled, to the frame 150. As shown, the guide member 170 extends between opposed tension arms 172. The illustrated movable dancer 156 also includes a position sensor, such as a rotary encoder 176, to detect a position of one or both of a tension arm 172 and the guide member 170. Thus, the rotary encoder 176 may be mounted to the frame 150 adjacent a tension arm 172. The rotary encoder 176 includes position sensors for measuring the angular position of the movable dancer 156 relative to the frame 150. Particularly, the rotary encoder 176 measures the angular position of one or both of a tension arm 172 and the guide member 170 of the movable dancer 156 relative to a default detection area 180 of the movable dancer 156 as the movable dancer 156 pivots in opposite directions in response to a tension in the advancing slit-sheet stock 122, 123.

Figure 7:
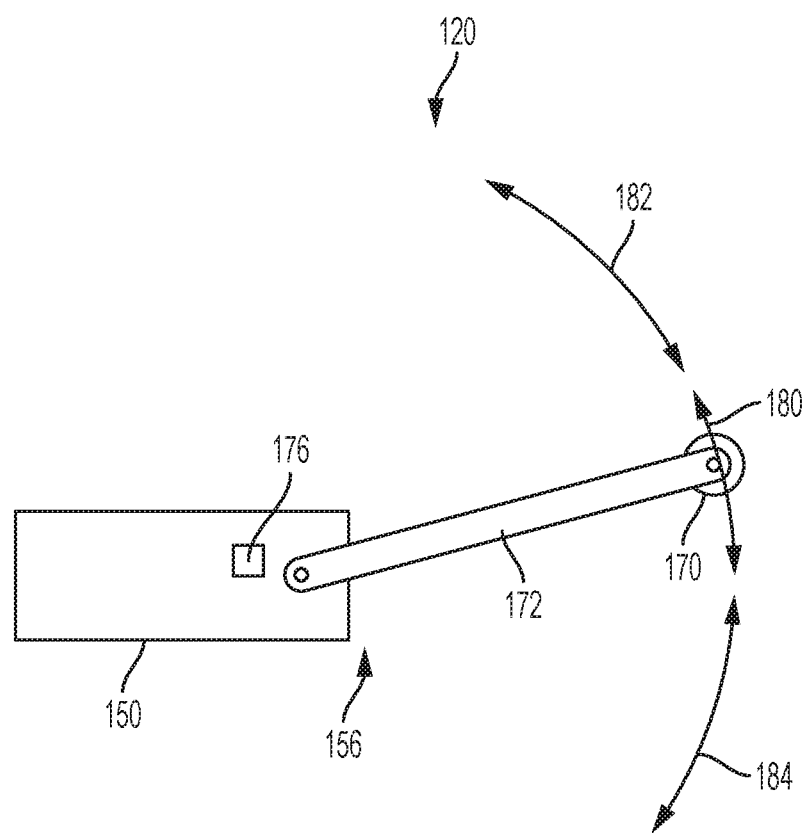
FIG. 7 is a schematic view of a portion of the dunnage conversion system of FIG. 2.

As shown best in FIG. 7, the movable dancer 156 is pivotable between an upper limit detection area 182 and a lower limit detection area 184. The default detection area 180 of the movable dancer 156 is angularly disposed between the upper limit detection area 182 and the lower limit detection area 184.

Each of the default detection area 180, the upper limit detection area 182, and the lower limit detection area 184 may be of any suitable angular size for providing optimum expansion of the unconverted slit-sheet stock 122, or more generally, for providing optimum tension of the sheet stock 122, 123. Additionally, or alternatively, any suitable number of detection areas may be used.

The controller 160 is generally configured to translate the position of the movable dancer 156 into a variable speed of the powered spindle 162 of the coiler 154. The controller 160 is communicatively coupled to each of the rotary encoder 176 of the movable dancer 156 and to the coiler 154, and is configured to control the speed of the coiler 154 to control tension of the slit-sheet stock 122, 123 upstream of the coiler 154.

The communicative connection between the controller 160 and each of the coiler 154 and the movable dancer 156 may be wired or wireless, or a combination thereof. The controller 160 is shown as disposed in the drive unit 164, though may be otherwise located in other embodiments. The controller 160 may be controlled, such as programmed, via a control panel 186 disposed on an external surface of the drive unit 164. The control panel 186 may include any suitable screen, keys, inputs, outputs, etc., for allowing control of the controller 160. The control panel 186 may be located elsewhere in other embodiments.

The controller 160 includes the necessary software, firmware, and hardware, including associated processors, for providing an operating environment for a computer-readable medium having processor-executable instructions for interacting with and controlling each of the coiler 154 and the movable dancer 156. Likewise, the coiler 154 and the movable dancer 156 include the necessary software, firmware, and hardware, including inputs and outputs, for sending and receiving data to and from the controller 160.

Via this configuration, the controller 160 is configured to receive angular position data from the rotary encoder 176. The controller 160 also is configured to send control signals to the coiler 154 based on the angular position of one or more of the tension arms 172 and the guide member 170 relative to each of the default detection area 180, the upper limit detection area 182, and the lower limit detection area 184.

In this way, the controller 160 is configured to progressively change the speed of the coiler 154 in response to movement of the movable dancer 156 out of the default detection area 180. For example, in one embodiment, the controller 160 runs the coiler 154 at a default first speed when the movable dancer 156 is disposed in the default detection area 180. The controller 160 runs the coiler 154 at a second speed greater than the first speed when the movable dancer 156 is disposed in the lower limit detection area 184. The controller 160 runs the coiler 154 at a third speed, being less than each of the first speed and the second speed, when the movable dancer 156 is disposed in the upper limit detection area 180.

Put another way, the speed at which the controller 160 is configured to run the coiler 154 is inversely proportional to a tension of the slit-sheet stock 122, 123 drawn about the movable dancer 156. Where the tension in the slit-sheet stock 122, 123 decreases and causes the movable dancer 156 to pivot in a first direction, the controller 160 increases the winding speed of the powered spindle 162. On the other hand, where the tension in the slit-sheet stock 122, 123 increases and causes the movable dancer 156 to pivot in a second direction opposite the first direction, the controller 160 decreases the winding speed of the powered spindle 162.

It is noted, that the speeds relative to the detection areas are provided with respect to the illustrated construction of the dunnage conversion system 120 having the sheet stock 122, 123 drawn under a bottom of the guide member 170. In other embodiments, the dunnage conversion system 120 may be constructed such that the sheet stock 122, 123 is drawn over a top of the guide member 170.

A method of making the coil of dunnage 24, 124 from a sheet stock 22, 23, 122, 123 also is provided. The method includes the steps of (a) winding the sheet stock 23, 123 in a converted form at a controlled tension into a coiled configuration about a spindle 30, 162 to form the coil of dunnage 24, 124, (b) drawing the sheet stock 22, 23, 122, 123 upstream of the spindle 30, 162 about a movable dancer 32, 156, the drawing applying tension in the sheet stock 22, 23, 122, 123 extending between the movable dancer 32, 156 and the spindle 30, 162, and (c) controlling the rotational speed of the spindle 30, 162 to control the tension in the sheet stock 22, 23, 122, 123 upstream of the spindle 30, 162, the speed being controlled in an inverse relationship relative to a tension in the sheet stock 22, 23, 122, 123 drawn about the movable dancer 32, 156. Controlling the rotational speed of the spindle 30, 162 may include controlling the speed based on the angular position of the movable dancer 32, 156. The sheet stock 22, 23, 122, 123 may be a slit-sheet stock. The method may further include the step of expanding the slit-sheet stock 22, 23, 122, 123 upstream of the spindle 30, 162.

In one summary, a dunnage conversion system 20, 120 for making a coil of dunnage 24, 124 from a sheet stock 22, 23, 122, 123 includes (i) a coiling means 30, 154 for winding sheet stock 23, 123 in a converted form into a coiled configuration to form the coil of dunnage 24, 124, (ii) a movable dancing means 32, 156 upstream of the coiling means 30, 154 about which the sheet stock 22, 122 is drawn, the movable dancing means 32, 156 for applying tension in the sheet stock 22, 122 between the movable dancing means 32, 156 and the coiling means 30, 154, and (iii) a controlling means 34, 160 communicatively coupled to the coiling means 30, 154 and to the movable dancing means 32, 156, the controlling means 34, 160 for controlling the speed of the coiling means 30, 154 in relation to a relative positioning of the movable dancing means 32, 156 to control the tension in the sheet stock 22, 122 between the movable dancing means 32, 156 and the coiling means 30, 154. The dunnage conversion system 20, 120 may further include (d) a measuring means 176 for measuring a pivot angle of the movable dancing means 32, 156 as the sheet stock 22, 23, 122, 123 is drawn about the measuring means 176. The controlling means 34, 160 may be configured to control a winding speed of a slit-sheet stock 22, 23, 122, 123 to control, upstream of the coiling means 34, 160, the conversion via expansion of the slit-sheet stock 22, 23, 122, 123 into an expanded strip of dunnage 23, 123.

Summarized another way, the present invention provides a dunnage conversion system 20, 120 for making a coil of dunnage 24, 124 from a sheet stock 22, 23, 122, 123, and includes a coiler 30, 154, a movable dancer 32, 156 upstream of the coiler 30, 154 and interposed in a path of the sheet stock 22, 23, 122, 123, and a controller 34, 160 communicatively coupled to each of the coiler 30, 154 and the movable dancer 32, 156. The coiler 30, 154 is configured to wind converted sheet stock 23, 123 into a coiled configuration to form a coil of dunnage 24, 124. The controller 34, 160 is configured to control the speed of the coiler 30, 154 based on the position of the movable dancer 32, 156 to control tension of the sheet stock 22, 122 upstream of the coiler 30, 154. The sheet stock 22, 23, 122, 123 drawn about the movable dancer 32, 156 to the coiler 30, 154 may be a slit-sheet stock 22, 23, 122, 123, for example, having a plurality of slits 42 configured to expand under tension applied across the slits 42, such as in a feed direction. The controller 34, 160 may be configured to control expansion of the slit-sheet stock 22, 23, 122, 123 upstream of the coiler 30, 154 allowing conversion of the sheet stock 22, 23, 122, 123 into a relatively less dense dunnage 23, 123 prior to or as it is wound into a coil 24, 124.

Although the invention has been shown and described with respect to certain embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. A dunnage conversion system for making a coil of dunnage from a sheet stock, the dunnage conversion system comprising:
   a supply of sheet stock having a length dimension, a width dimension, a thickness dimension, and a plurality of transverse rows of slits extending across the width dimension, with the slits in adjacent rows offset, wherein the slits will open and the sheet stock will expand in the length dimension and in the thickness dimension under tension applied in a direction transverse the slits;

a coiler to wind the sheet stock into a coiled configuration to form a coil of dunnage;

a movable dancer interposed in a path of the sheet stock, between the supply and the coiler, and a controller communicatively coupled to the coiler and to the movable dancer, where the controller controls the speed of the coiler based on the position of the movable dancer to control tension of the sheet stock upstream of the coiler;

wherein the controller controls a winding speed of the sheet stock at the coiler to control conversion of the sheet stock via opening of the slits and expansion of the sheet stock upstream of the coiler.

2. The dunnage conversion system of claim 1, wherein the movable dancer pivots in response to tension of the sheet stock drawn between the supply and the coiler.

3. The dunnage conversion system of claim 1, wherein the movable dancer pivots in response to contact with the sheet stock upstream of the coiler, and wherein the controller increases the speed of the coiler in response to a pivoting movement of the movable dancer in a first direction, and the controller decreases the speed of the coiler in response to pivoting movement of the movable dancer in a second direction opposite the first direction.

4. The dunnage conversion system of claim 1, wherein the coiler includes a powered rotating spindle that is configured to rotate at a variable speed in response to varying tension of the sheet stock at the location of the movable dancer.

5. The dunnage conversion system of claim 1, wherein the speed at which the controller is configured to run the coiler is inversely proportional to a tension in the sheet stock drawn about the movable dancer.

6. The dunnage conversion system of claim 1, further including a rotary encoder for measuring the position of the movable dancer relative to a default position, the rotary encoder being configured for communication with the controller.

7. The dunnage conversion system of claim 6, wherein the rotary encoder is configured to measure the angular position of the movable dancer relative to the default position.

8. The dunnage conversion system of claim 1, wherein the supply further includes a supply of separator sheet material, and wherein the coiler is configured to concurrently receive and wind the separator sheet material and the slit sheet stock in alternating wound layers.

\* \* \* \* \*